(12) United States Patent
Hawksworth et al.

(10) Patent No.: US 8,986,159 B2
(45) Date of Patent: Mar. 24, 2015

(54) NOSE-WHEEL STEERING ACTUATOR

(71) Applicant: Goodrich Actuation Systems Limited, Solihull (GB)

(72) Inventors: Andrew Robert Hawksworth, Newport (GB); John H. Harvey, Wolverhampton (GB)

(73) Assignee: Goodrich Actuation Systems Limited (GB)

( * ) Notice: Subject to any disclaimer, the term of this patent is extended or adjusted under 35 U.S.C. 154(b) by 128 days.

(21) Appl. No.: 13/748,950

(22) Filed: Jan. 24, 2013

(65) Prior Publication Data

US 2013/0193267 A1 Aug. 1, 2013

(30) Foreign Application Priority Data

Jan. 26, 2012 (GB) .................................. 1201270.4

(51) Int. Cl.
| | | |
|---|---|---|
| *F16H 1/30* | (2006.01) | |
| *B64C 25/50* | (2006.01) | |
| *F16H 25/20* | (2006.01) | |
| *F16H 55/26* | (2006.01) | |
| *F16H 25/22* | (2006.01) | |

(52) U.S. Cl.
CPC ............... *B64C 25/50* (2013.01); *F16H 25/20* (2013.01); *F16H 55/26* (2013.01); *F16H 25/2252* (2013.01); *F16H 2025/2075* (2013.01)
USPC ......................................................... 475/333

(58) Field of Classification Search
USPC ................................................. 475/149, 333
See application file for complete search history.

(56) References Cited

U.S. PATENT DOCUMENTS

| | | | |
|---|---|---|---|
| 3,498,153 A | 3/1970 | Wagner | |
| 3,754,479 A | 8/1973 | Elser | |
| 3,810,395 A | 5/1974 | Takahashi et al. | |
| 7,736,256 B2* | 6/2010 | Sugitani | ............................ 475/4 |
| 2003/0006119 A1* | 1/2003 | Harvey | ......................... 192/141 |
| 2009/0090204 A1* | 4/2009 | Jones et al. | .................. 74/89.39 |
| 2009/0242692 A1* | 10/2009 | Hadley et al. | ................... 244/50 |
| 2010/0077879 A1* | 4/2010 | Davies et al. | ................ 74/89.38 |
| 2011/0177901 A1* | 7/2011 | Blach | ............................... 475/5 |

FOREIGN PATENT DOCUMENTS

| | | |
|---|---|---|
| EP | 0000877 | 3/1979 |
| GB | 1026482 | 4/1966 |
| GB | 1197044 | 7/1970 |
| GB | 1 574 256 | 9/1980 |
| GB | 2111635 | 7/1983 |

(Continued)

OTHER PUBLICATIONS

British Search Report dated May 25, 2012.

(Continued)

*Primary Examiner* — Edwin A Young
(74) *Attorney, Agent, or Firm* — Cantor Colburn LLP

(57) ABSTRACT

An actuator comprises a shaft 12 arranged to be driven for rotation by an electrically powered motor 18, a sleeve 22 encircling at least part of the shaft 12 and carrying a toothed rack formation 26, and a low friction screw coupling 36 between the shaft 12 and the sleeve 22 and arranged such that rotation of the shaft 12 drives the sleeve 22 for axial movement, wherein the low friction screw coupling 36 is adjacent and aligned with the rack formation 26.

14 Claims, 2 Drawing Sheets

(56) References Cited

FOREIGN PATENT DOCUMENTS

Figure 1:
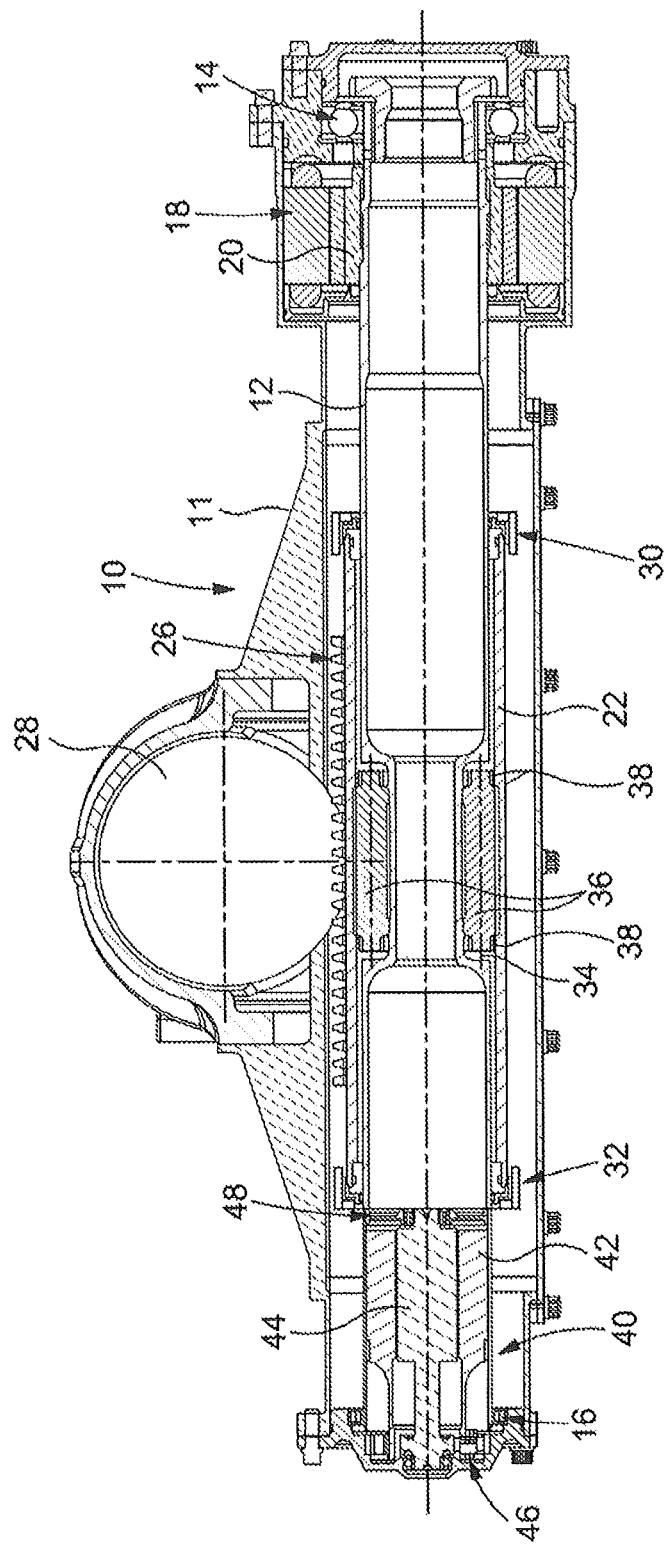

| | | |
|---|---|---|
| JP | 60 188655 | 9/1960 |
| JP | 2005321031 | 11/2005 |

OTHER PUBLICATIONS

Extended European Search Report Application No. 13151489.5; date of issue Mar. 7, 2013 (3 pages).

* cited by examiner

NOSE-WHEEL STEERING ACTUATOR

This invention relates to an actuator, and in particular to an actuator for use in the steering of an aircraft nose-wheel.

A typical nose-wheel steering arrangement includes an axially translatable toothed rack, the teeth of which are cooperable with the teeth of a toothed pinion formation provided upon a support structure associated with the nose-wheel. Axial movement of the rack drives the pinion, and hence the support structure, for angular movement, thus adjusting the orientation of the nose-wheel to effect steering. The rack is typically hydraulically driven.

There is a desire to use electrically powered actuators in applications in which, traditionally, hydraulically powered actuators have been used. One way in which an electrically powered actuator can be used in controlling nose-wheel steering is to use an electric motor driven linear actuator to drive the rack of an arrangement of the type described hereinbefore for translating movement. For example, the actuator may comprise a rotatable, but axially fixed, threaded nut arranged to be driven for rotation by the electric motor, the nut cooperating with an axially moveable, non-rotating shaft by way of a ball-screw or similar low friction coupling. The shaft is coupled at an end thereof to the steering rack.

Such an arrangement is typically of relatively large dimensions, and so not easy to accommodate, in use. Also, alignment of the shaft and rack, providing adequate support for the rack, and mechanical and hydraulic balancing of the actuator can be difficult to achieve. It is an object of the invention to provide an actuator suitable for use in such applications and which is of relatively compact, simple and convenient form.

U.S. Pat. No. 3,810,395 describes an actuator in which a toothed rack element is translatable to drive a toothed pinion component for angular movement. The rack element forms part of a nut translatable along a screw shaft. A similar arrangement is described in GB1197044

According to the invention there is provided an actuator comprising a shaft arranged to be driven for rotation by an electrically powered motor, a sleeve encircling at least part of the shaft and carrying a toothed rack formation, and a low friction screw coupling between the shaft and the sleeve and arranged such that rotation of the shaft drives the sleeve for axial movement, wherein the low friction screw coupling is adjacent and aligned with the rack formation, the shaft including a reduced diameter region at which are located elements forming part of the low friction screw coupling.

Such an arrangement is advantageous in that many of the components of the actuator are located concentrically relative to one another, and so the actuator can be of relatively compact form. Furthermore, the shaft can provide support for the sleeve which, in turn, supports the rack formation, thus ensuring that the rack formation is well supported. The location of the low friction coupling further allows the actuator to be substantially mechanically balanced. Additionally, by locating elements forming part of the low friction screw coupling at the reduced diameter region, the said elements can be accommodated without significantly increasing the dimensions of the actuator.

The shaft is conveniently of tubular form. The low friction screw coupling conveniently comprises a roller-screw coupling.

The roller elements are conveniently in threaded engagement with the shaft and with the sleeve. In use, rotation of the shaft drives the roller elements for rotation about their respective axes. The rotation of the roller elements drives the sleeve, and hence the rack formation, for axial longitudinal movement.

The roller elements conveniently do not move axially, in use. As a result, hydraulic imbalances in the lubricant conveniently located between the shaft and the sleeve are reduced, and the seals preferably provided therebetween do not need to be able to withstand such imbalances.

A support ring is preferably provided to locate the roller elements, maintaining a predetermined spacing therebetween. The support ring is conveniently of split ring form.

A damping arrangement is conveniently provided to damp the rotation of the shaft. The damping arrangement may be, for example, of magnetic form. Conveniently, a gear arrangement is provided between the shaft and an input of the damping arrangement. For example, the gear arrangement may be of epicyclic form.

Figure 2:
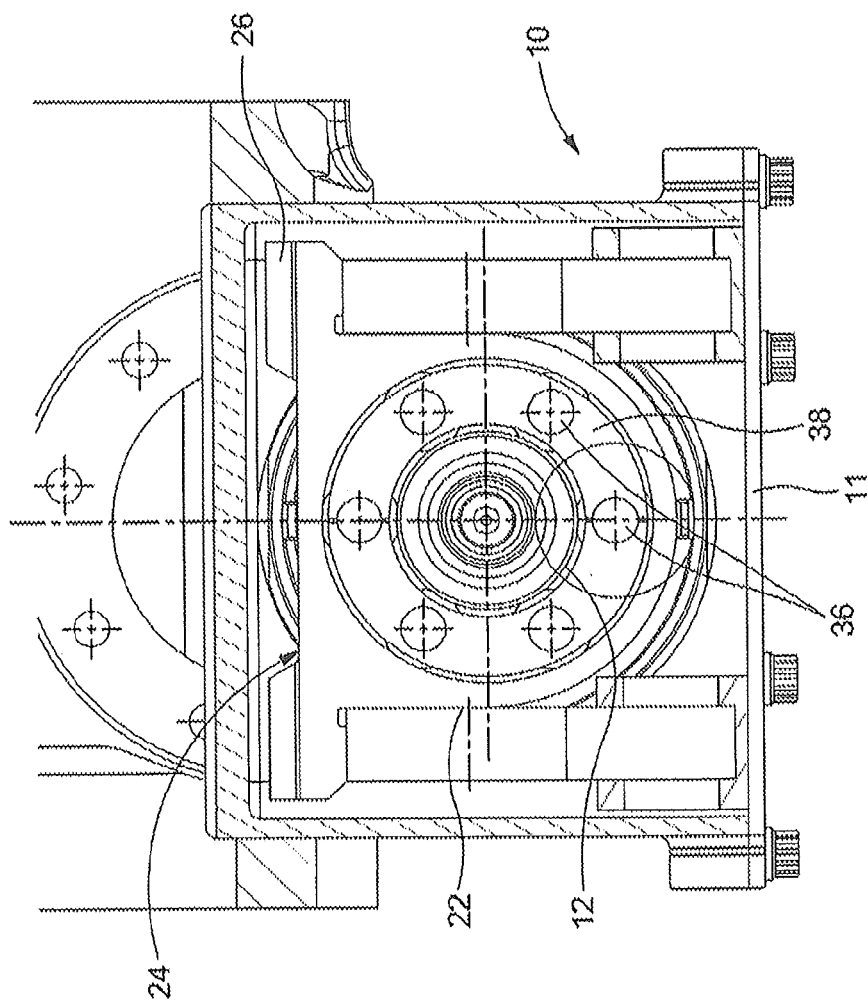

The invention will further be described, by way of example, with reference to the accompanying drawings, in which:

FIG. 1 is a sectional view illustrating an actuator in accordance with one embodiment of the invention; and FIG. 2 is a view illustrating part of the actuator of FIG. 1.

Referring firstly to FIG. 1, a nose-wheel steering actuator 10 is illustrated which comprises a housing 11 within which a tubular drive shaft 12 is supported for rotation by bearings 14, 16. The housing 11 also accommodates an electrically powered motor 18, the rotor 20 of which is secured to the shaft 12 such that operation of the motor 18 drives the shaft 12 for rotation.

Encircling a central part of the shaft 12 is a sleeve 22. As best shown in FIG. 2, the sleeve 22 is not of circular cross-section, but rather defines a flat 24 provided with the teeth of a rack formation 26. The teeth of the rack formation 26 cooperate with the teeth (not shown) of a pinion formation 28 provided upon or associated with a support structure of an aircraft nose-wheel (not shown). It will be appreciated that, in use, axial movement of the sleeve 22 and rack formation 26 drives the pinion formation 28 and associated support structure and nose-wheel for angular movement. By controlling the position and movement of the sleeve 22, steering of the nose-wheel can be achieved.

At its ends, the sleeve 22 is provided with bearing/seal arrangements 30, 32 which serve to support the sleeve 22 for axial movement, accommodating rotary movement of the shaft 12 relative thereto, retaining lubricant between the shaft 12 and the sleeve 22, and resisting the ingress of debris therebetween. The cooperation between the rack formation 26 and the pinion formation 28 restricts angular movement of the sleeve 22 about its axis. As the sleeve 22 is supported upon the shaft 12, and angular or rotary movement of the sleeve 22 is prevented, it will be appreciated that the only movement which the sleeve 22 is able to undertake is axial movement.

A part or region of the shaft 12 located within the sleeve 22 is of reduced diameter, and so defines with the sleeve 22 an annular void 34. A series of roller elements 36 are located within the void 34. The roller elements 36 are each of threaded form, the threads thereof engaging with both an external thread formation provided on the reduced diameter region of the shaft 12, and with an internal thread formation provided on the adjacent part of the sleeve 22. The ends of the roller elements 36 cooperate with support rings 38 which serve to hold the rollers elements 36 with a predetermined, substantially uniform spacing about the shaft 12. The ends of the roller elements 36 are conveniently a running fit within corresponding openings provided in the support rings 38. For convenience and ease of assembly, the support rings 38 are preferably of split ring form.

The roller elements 36, in combination with the thread formations provided on the shaft 12 and sleeve 22 serve to form a low friction threaded coupling between the shaft 12 and the sleeve 22. As the sleeve 22 is unable to rotate, it will be appreciated that the coupling results in rotation of the shaft 12 causing axial or longitudinal movement of the sleeve 22. Any tendency for the rotation of the shaft 12 to cause axial displacement of the roller elements 36 is countered or reacted by virtue of the cooperation between the roller elements 36 and the sleeve 22. Whilst the roller elements 36 and support rings 38 are not secured to the housing 11, in use the roller elements 36 will tend to remain in a fixed position, each roller element 36 rotating about its respective substantially fixed axis rather than precessing about the shaft 12.

If desired, the shaft 12 may be provided with one or more toothed rings, the teeth of which cooperate with corresponding teeth provided at the ends of roller elements 36 such that rotation of the shaft 12 positively drives each roller element 36 for rotation about its respective axis, rather than relying upon the cooperation between the thread formations, alone, to achieve this. As a result, improved load distribution can be achieved and parasitic frictional losses reduced in the coupling between the shaft 12 and the sleeve 22.

In use, when it is desired to adjust the angular position of the nose-wheel support structure in order to effect steering, the motor 18 is driven for operation to drive the shaft 12 for rotation. The rotation of the shaft 12 in turn results in rotation of the roller elements 36 about their respective axes, and the cooperation between the threads of the roller elements 36 and the corresponding thread formation of the sleeve 22 results in the sleeve 22 being driven for axial or longitudinal movement. The direction of movement is determined by the direction of rotary movement of the shaft 12. As the sleeve 22 carries the rack formation 26, it will be appreciated that the translation of the sleeve 22 also results in the rack formation 26 translating which, in turn, causes rotation or angular movement of the pinion formation 28 and the support structure. Once the support structure has been moved to a desired orientation, rotation of the shaft 12 by the motor 18 ceases.

It will be appreciated that, in this arrangement, the low friction coupling between the shaft 12 and the sleeve 22 is located adjacent, and is aligned with, the rack formation 26, rather than being located at, for example, an end thereof. As a result, the actuator can be of enhanced compactness, and so it relatively easy to accommodate, in use. The problems associated with having to axially align a steering rack with an associated actuator, as experienced in some known arrangements are avoided. Furthermore, the rack formation 26 and sleeve 22 are well supported by the shaft 12, which is of good stiffness, and which, in turn, is well supported by the housing 11 via the bearings 14, 16, and thus loadings experienced by the rack formation 26, in use, can be reacted to the housing 11 in a convenient manner with minimal risk of damage or increased wear to parts of the actuator. Furthermore, by locating the low friction coupling in a position that is aligned with the rack formation, the actuator is mechanically balanced.

Typically with screw-coupling assemblies the sealing arrangements are pressurised by the hydraulic piston effect of the rollers within their lubricated environment as they translate laterally along the shaft. With the present invention the roller elements 36 are fixed in an axial position and there is minimal pressurisation of the lubricated environment between the shaft 12 and the sleeve 22. As such, the bearing/seal arrangements 30, 32 do not have to be designed to withstand any hydraulic imbalance, and can be of simplified form, which ultimately results in a more reliable actuator 10.

As illustrated, a damping arrangement 40 is provided. The damping arrangement 40 takes the form of a magnetic damper, but other forms of damper, for example a magneto-rheological arrangement, could be used. The damping arrangement 40 includes an outer component 42 rigidly fixed to, and located with an end part of, the shaft 12 so as to rotate therewith. An inner component 44 of the damping arrangement 40 is connected to an output of an epicyclic gearbox 46, an input of which is driven from the shaft 12. Bearings 48 are provided between the inner and outer components 42, 44 of the damping arrangement 40.

In use, the damping arrangement 40 serves to damp vibrations or oscillations transmitted back to the shaft 12 through the pinion 28, rack 26, sleeve 22 and low friction coupling, and arising from shimmying of the nose-wheel, thereby reducing the impact that such nose-wheel shimmying and the resultant vibrations or oscillations may have upon the operation and reliability of the actuator.

It will be appreciated that a wide range of modifications and alterations may be made to the arrangement described hereinbefore without departing from the scope of the invention. For example, whilst in the arrangement described hereinbefore the low friction coupling is achieved by the use of a roller-screw arrangement, other couplings could be used, such as a ball-screw arrangement, the choice of coupling being dependent upon the loads transmitted through the actuator.

The invention claimed is:

1. An actuator comprising a shaft arranged to be driven for rotation by an electrically powered motor, a sleeve encircling at least part of the shaft and carrying a toothed rack formation, and a low friction screw coupling between the shaft and the sleeve and arranged such that rotation of the shaft drives the sleeve for axial movement, wherein the low friction screw coupling is adjacent and aligned with the rack formation, the shaft including a reduced diameter region at which are located elements forming part of the low friction screw coupling.

2. An actuator according to claim 1, wherein the shaft provides support for the sleeve.

3. An actuator according to claim 1, further comprising bearing means located between the shaft and the sleeve.

4. An actuator according to claim 1, further comprising seal means between the shaft and the sleeve, the seal means serving to seal a lubricant between the shaft and the sleeve providing lubrication to the low friction screw coupling.

5. An actuator according to claim 4, further comprising bearing means located between the shaft and the sleeve, wherein the bearing means and seal means are integral with one another.

6. An actuator according to claim 1, wherein the shaft is of tubular form.

7. An actuator according to claim 1, wherein the low friction screw coupling comprises a roller-screw coupling, and the said elements comprise a plurality of roller elements forming part of the roller-screw coupling.

8. An actuator according to claim 7, wherein the roller elements do not move axially of the shaft, in use.

9. An actuator according to claim 7, wherein the roller elements are in threaded cooperation with both the shaft and the sleeve.

10. An actuator according to claim 7, further comprising a support ring arranged to locate the roller elements, maintaining a predetermined spacing therebetween.

11. An actuator according to claim 1, further comprising a damping arrangement operable to damp the rotation of the shaft.

12. An actuator according to claim 11, wherein the damping arrangement is of magnetic form.

13. An actuator according to claim 11, wherein a gear arrangement is provided between the shaft and an input of the damping arrangement.

14. An actuator according to claim 13, wherein the gear arrangement is of epicyclic form.

\* \* \* \* \*